United States Patent
Wood et al.

(10) Patent No.: US 9,960,846 B2
(45) Date of Patent: May 1, 2018

(54) FREE-SPACE OPTICAL COMMUNICATION SYSTEM AND METHOD IN SCATTERING ENVIRONMENTS

(71) Applicant: LGS Innovations LLC, Herndon, VA (US)

(72) Inventors: Thomas Huntington Wood, Holmdel, NJ (US); Stephan Frank Wielandy, Madison, NJ (US); Andrew Russell Grant, Freehold, NJ (US)

(73) Assignee: LGS INNOVATIONS LLC, Herndon, VA (US)

(*) Notice: Subject to any disclaimer, the term of this patent is extended or adjusted under 35 U.S.C. 154(b) by 151 days.

(21) Appl. No.: 15/210,276

(22) Filed: Jul. 14, 2016

(65) Prior Publication Data

US 2017/0237485 A1    Aug. 17, 2017

Related U.S. Application Data (60) Provisional application No. 62/192,244, filed on Jul. 14, 2015.

(51) Int. Cl.
*H04B 10/11* (2013.01)
*H04B 10/61* (2013.01)
*H04B 10/516* (2013.01)
*H04B 10/80* (2013.01)

(52) U.S. Cl.
CPC ........... *H04B 10/11* (2013.01); *H04B 10/516* (2013.01); *H04B 10/612* (2013.01); *H04B 10/80* (2013.01)

(58) Field of Classification Search
CPC ..... H04B 10/11–10/1129; H04B 10/61–10/64; H04B 10/80
See application file for complete search history.

(56) References Cited

U.S. PATENT DOCUMENTS

| | | | | |
|---|---|---|---|---|
| 5,991,062 A | * | 11/1999 | Fischer | H04B 10/60 398/1 |
| 9,337,934 B1 | * | 5/2016 | Agazzi | H04B 10/40 |
| 2009/0214224 A1 | * | 8/2009 | Cho | H04B 10/61 398/188 |
| 2010/0247099 A1 | * | 9/2010 | Lowery | H04B 10/2543 398/79 |
| 2012/0008961 A1 | * | 1/2012 | Chen | H04B 10/613 398/119 |
| 2013/0216232 A1 | * | 8/2013 | Zanoni | H04B 10/5055 398/79 |
| 2014/0362869 A1 | * | 12/2014 | Pan | H04B 10/27 370/436 |
| 2015/0222468 A1 | * | 8/2015 | Li | H04L 27/2628 375/295 |
| 2016/0261347 A1 | * | 9/2016 | Karar | H04B 10/6162 |
| 2016/0352432 A1 | * | 12/2016 | Jensen | H04B 10/616 |

\* cited by examiner

*Primary Examiner* — David Payne
*Assistant Examiner* — Casey Kretzer
(74) *Attorney, Agent, or Firm* — Baker and Hostetler LLP (57) ABSTRACT

A free-space optical communication system is provided. The free-space optical communication system includes a transmitter configured to optically transmit data in a plurality of subcarrier signals over a free-space scattering medium. The free-space optical communication system includes a coherent receiver configured to receive the plurality of subcarrier signals and extract the transmitted data from the plurality of subcarrier signals after traversal over the free-space scattering medium.

20 Claims, 7 Drawing Sheets

FREE-SPACE OPTICAL COMMUNICATION SYSTEM AND METHOD IN SCATTERING ENVIRONMENTS

CROSS-REFERENCE TO RELATED APPLICATION

This patent application benefits from the priority of filing date of the Provisional Application Ser. No. 62/192,244, filed Jul. 14, 2015, entitled "SYSTEM FOR OPTICAL COMMUNICATION IN SCATTERING ENVIRONMENTS USING DENSE FREQUENCY-DIVISION MULTIPLEXING," which Provisional Application is incorporated by reference in its entirety herein.

FIELD

The present application generally relates to communication systems, and particularly to systems and methods for free-space optical (FSO) communications through a scattering medium.

BACKGROUND

Generally, in free-space mediums such as water or fog, optical pulses transmitted from a transmitter get scattered and arrive at the receiver spread over time. This effect is called spatial dispersion. When a high data rate signal is sent over a data link in such mediums via transmission of a series of short pulses, these pulses overlap before arriving at the receiver. These pulses then cannot individually be decoded. Accordingly, the data rate of such links is limited.

Figure 1:
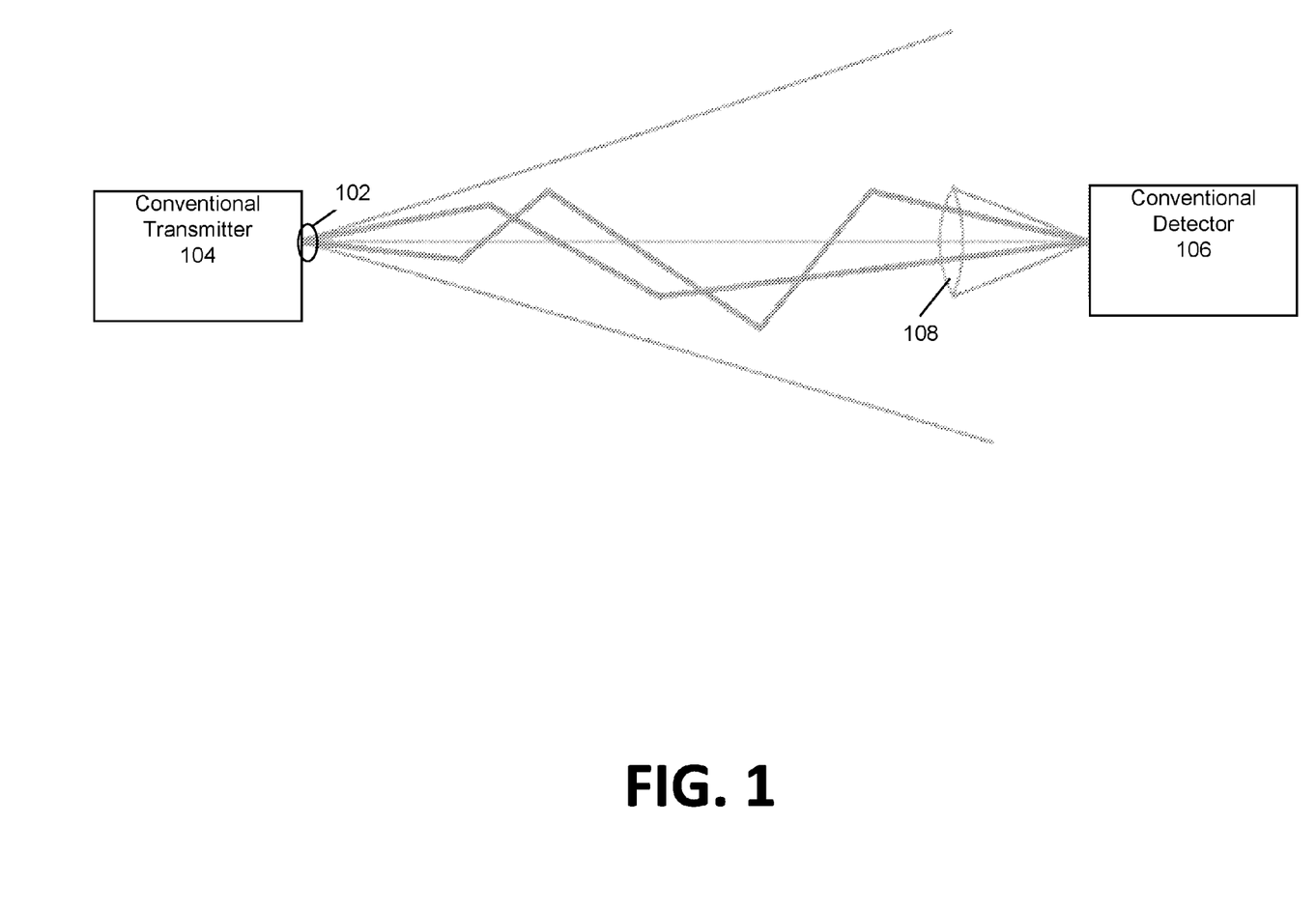
FIG. 1 illustrates a free-space optical link through a scattering medium using a conventional transmitter and a conventional detector.

FIG. 1 illustrates such scattering where an optical signal 102 or light is launched from a conventional transmitter 104 toward a conventional detector 106 in a free-space optical (FSO) link between the two. Some of the optical signal 102, i.e., the straight horizontal line between the conventional transmitter 104 and the conventional detector 106, directly reaches the conventional detector 106. Other portions of the transmitted beam, i.e., zig-zagged lines in FIG. 1, are scattered one or more times, before being collected by conventional receiving optics 108 and ultimately being delivered to the conventional detector 106. The optical signal 102 portions from these more indirect routes traverse a longer distance resulting in a delayed arrival. Thus, even if the conventional transmitter 104 launches a short pulse in time, such a short pulse arrives with a significant delay and/or spread in time at the conventional detector 106.

The spectral bandwidth of conventional FSO links is set by optical filter limitation. In particular, sunlight is a significant source of interference for FSO links. Optical filters with an optical bandwidth of about 20 GHz are generally employed in front of the conventional detector 106 to attenuate out-of-band sunlight. Interfering solar background can be further reduced by about 10 dB by transmitting light within approximately 10 GHz-wide dips in the solar spectrum, i.e., Fraunhofer dips. However, since the pulse spreading from a spatial dispersion for many FSO links through scattering media is about 1 µs, the data transmission rate is limited to about 1 Mb/s for systems employing individual pulses. As a result, the scattering limit is about 1,000 times lower than the channel bandwidth limit set by available optical filters.

Frequency-Division Multiplexing (FDM) is a conventional way of overcoming inefficiencies in a dispersion-limited channel. In FDM, separate channels are employed to carry data at a rate that is slow enough to propagate through the dispersive/scattering medium, and yet still successfully be recovered. High capacity optical fiber-based communication systems frequently operate with multiple frequency bands with n approximately equal to 80. For example, with 'n' FDM channels, the data rate can be increased by n times over that of a single channel. A separate transmitter and receiver are typically employed for each frequency, and optical components multiplex and demultiplex the 'n' individual channels.

Using FDM of many low-bandwidth channels (e.g., ~1 Mb/s) in a scattering medium offers more complete utilization of the available ~10 GHz channel bandwidth, but conventional FDM is not practical in this scattering medium scenario due to a very large n (ideally, n≈1000). Namely, it is commercially impractical to have n separate transmitters and receivers in such FSO links. Moreover, components are not readily available to multiplex and demultiplex frequency bands separated by as little as 1 MHz in the optical domain. This is true for transmission through scattering mediums such as water, fog, and clouds where the large spread in arrival times from scattering limits the data rate of an individual channel.

Various aspects of this application are directed towards addressing these and other drawbacks and challenges of conventional free-space optical communication systems and methods.

SUMMARY

The present application will be discussed in more detail below.

In accordance with an aspect of the patent application, a free-space optical communication system is provided. The free-space optical communication system includes a transmitter configured to optically transmit data in a plurality of subcarrier signals over a free-space scattering medium. The free-space optical communication system includes a coherent receiver configured to receive the plurality of subcarrier signals and extract the transmitted data from the plurality of subcarrier signals after traversal over the free-space scattering medium.

In accordance with another aspect of the patent application, a free-space optical communication method is provided. The free-space optical communication method includes transmitting optically, from a transmitter, data allocated to a plurality of subcarrier signals over a free-space scattering medium. The free-space optical communication method includes receiving, at a coherent receiver, the plurality of subcarrier signals, wherein said receiving includes extracting, at the coherent receiver, the transmitted data from the plurality of subcarrier signals after traversal through the free-space scattering medium.

In accordance with yet another aspect of the patent application, an underwater optical detection method includes receiving, at a coherent receiver in an underwater environment, a plurality of subcarrier signals from a transmitter in the underwater environment. The underwater optical detection method includes extracting, at the coherent receiver, transmitted data in the plurality of subcarrier signals after traversal through the underwater environment.

DESCRIPTION OF THE FIGURES

In order to facilitate a more robust understanding of the application; reference is now made to the accompanying drawings, in which like elements are referenced with like numerals. These drawings should not be construed to limit the scope of the application and are for illustrative purposes only.

DETAILED DESCRIPTION

Various aspects of this application will now be described with reference t the drawing figures, in which like reference numerals refer to like parts throughout.

One or more aspects of this application are directed to systems and methods for free-space optical communications. Such systems and methods may employ a coherent receiver 400 (illustrated in FIG. 4) that recovers data and separates individual frequency bands 202(1)-202(n) (illustrated in FIG. 2) received from a transmitter 300 (illustrated in FIG. 3) transmitting over a scattering medium (e.g., underwater, fog, clouds, or atmosphere). The transmitter 300 and the coherent receiver 400 together form the free-space optical communication system in accordance with an aspect of the application herein. By way of example only and not by way of limitation, the transmitter 300 and the coherent receiver 400 may be separated by a free-space scattering medium by up to 10 km. Further, according to an aspect of this application, the transmitter 300 and the coherent receiver 400 may be located in an underwater environment (e.g., on two different submarines) or, on land (e.g., on two buildings).

Figure 2:
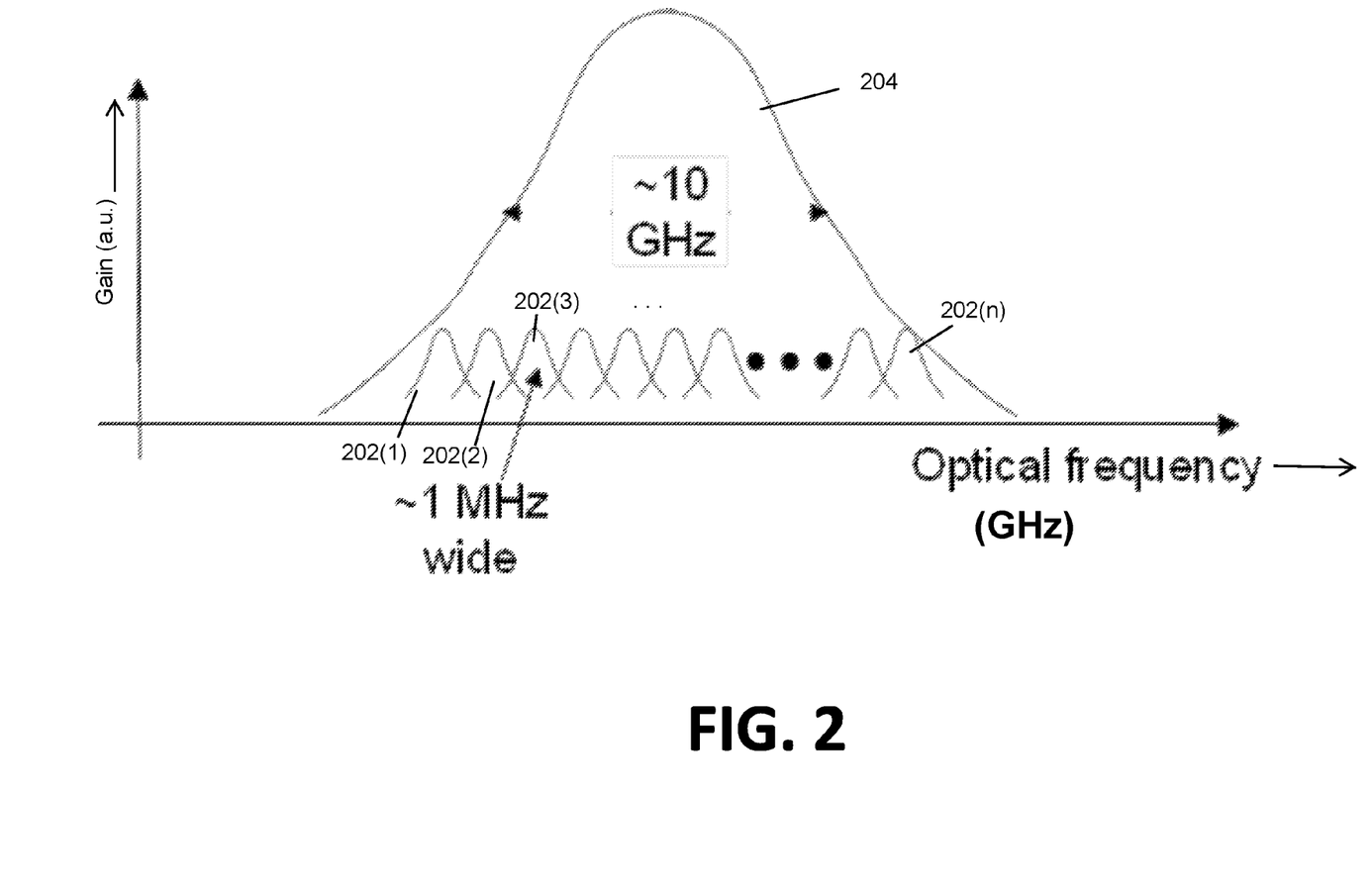
FIG. 2 illustrates a plurality of narrow frequency bands corresponding to a plurality of subcarrier signals at a transmitter, according to an aspect of the application.
Figure 3:
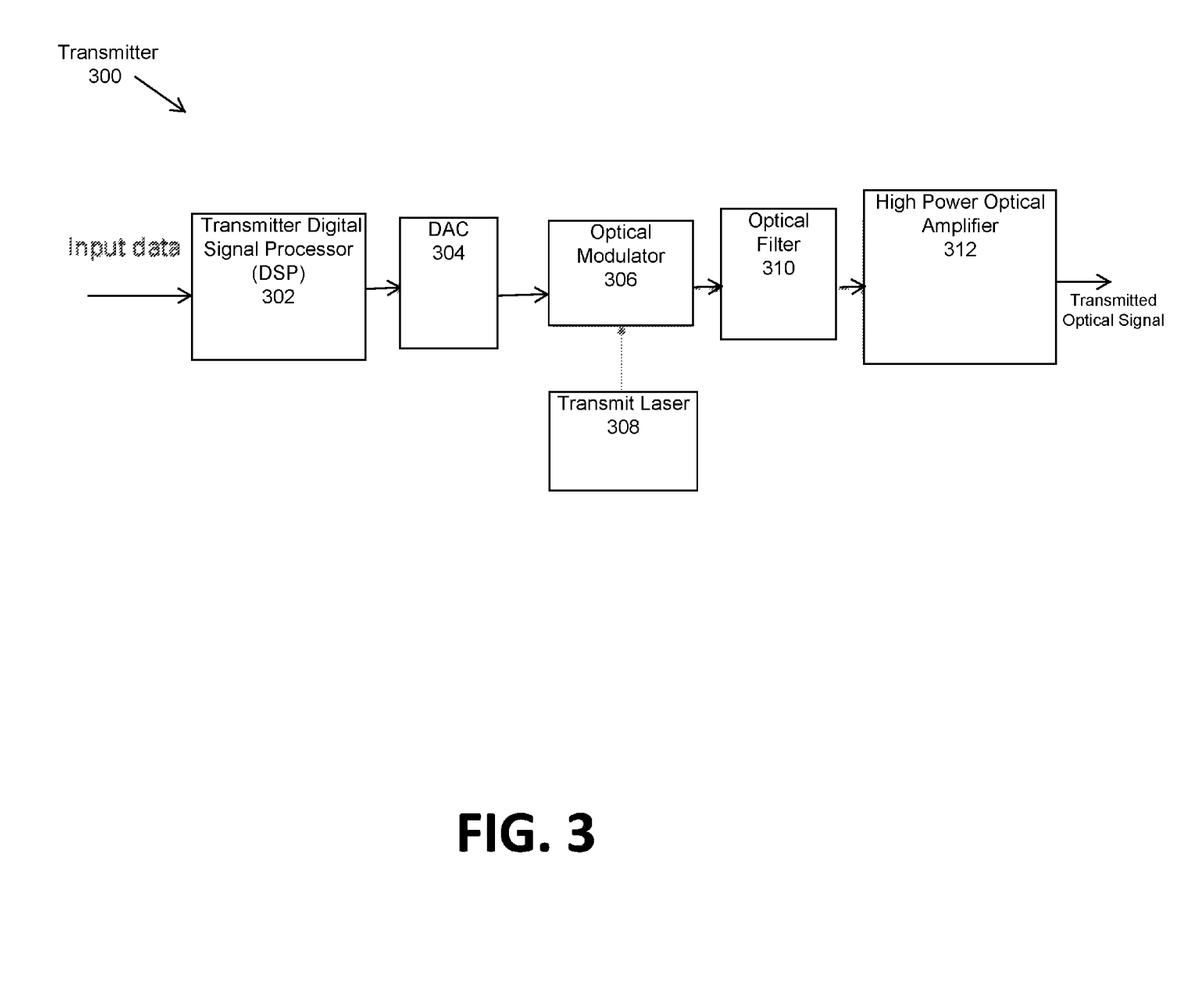
FIG. 3 illustrates a transmitter for a free-space optical communication system, according to an aspect of the application.

Referring to FIGS. 2 and 3, a number of the individual frequency bands 202(1)-202(n), n being an integer having a value of at least 3, are established within a larger bandwidth channel 204 at the transmitter 300. The individual frequency bands 202(1)-202(n) correspond to a frequency spectrum of a plurality of subcarrier signals (not shown) output by a transmitter digital signal processor (DSP) 302. Information is sent on the individual frequency bands 202(1)-202(n) by allocating input data from a source (e.g., a computer, not shown) to one or more of the plurality of subcarrier signals having frequencies represented by the individual frequency bands 202(1)-202(n) lying inside the larger bandwidth channel 204. The plurality of subcarrier signals may be large in number (e.g., 80 or more) or may be smaller, but are at least three in number.

In one aspect of this application, the larger bandwidth channel 204 has a bandwidth of 10 GHz. By way of example only and not by way of limitation, the value of 10 GHz for the larger bandwidth channel 204 may correspond to the Fraunhofer dips in the solar spectrum when the free-space optical communication system is implemented over an atmospheric channel (e.g., between two buildings) or an undersea channel. The term "free-space" as used herein applies to a communication channel or communication medium that is optical fibreless and/or wireless. Generally, such a scattering medium is non-deterministic and is not accurately modeled using classical waveguide theory for mathematically describing other communication channels such as wired or optical fiber based communication channels. Accordingly, the scattering of the optical signal 102 (e.g., from the transmitter 300) is associated with varying channel parameters that, at best, are approximated using random variables and probabilistic models. Such free-space optical mediums having scattering properties for optical and other types of signals (e.g., acoustic signals) are understood by one of ordinary skill in the art and will not be further described herein.

Referring to FIG. 3, the transmitter 300 of a free-space optical communication system is illustrated, in accordance with an aspect of this application. The transmitter 300 includes the transmitter DSP 302. The transmitter DSP 302 is coupled to a digital to analog converter (DAC) 304. The DAC 304 is coupled to an optical modulator 306 at a first input. The optical modulator 306 is further coupled to a transmit laser 308 at a second input and optionally to an optical filter 310 at an output. In one aspect, the optical modulator 306 is optional, in which case the transmit laser 308 is subjected to direct modulation (injection modulation) by the output of the DAC 304. The optical filter 310 is coupled to a high-power optical amplifier 312, the term "high-power" with respect to the high-power optical amplifier (HPOA) 312 being understood by one of ordinary skill in the art as an optical amplifier that has an optical output power of 0.1-50 W The transmitter DSP 302 is programmable to allocate the input data to various subcarrier signals. Such allocation of the input data may be dynamic or in real-time, as the transmitter 300 is transmitting. Such allocation includes applying binary data to electrical signals, generated by the transmitter DSP 302, that form the plurality of subcarrier signals whose frequencies are represented by the individual frequency bands 202(1)-202(n) in FIG. 2, for example. One exemplary reason for such dynamic allocation of the input data to the plurality of subcarrier signals is that the transmission characteristics change with temperature, pressure, or other performance metrics associated with free-space optical communications. For example, the bit error rate (BER) for each of the plurality of subcarrier signals when imposed on a narrow-linewidth output carrier optical signal output by the transmit laser 308 may change during transmission with one or more subcarrier signals showing a higher BER compared to other subcarrier signals. In such a scenario, based on this performance metric, the input data mapping to the plurality of subcarrier signals may be altered to allot more input data to lower BER subcarrier signals. Such dynamic reallocation improves the overall transmission and reception efficiency, for example, by reducing the overall BER. Further, the transmitter DSP 302 may apply data interleaving and forward error correction to the input data prior to allocation to the plurality of subcarrier signals. Still further, the transmitter DSP 302 may be configured to apply encryption to the input data for securing the free-space optical communication between the transmitter 300 and the coherent receiver 400. Likewise, one or more transmission metrics (e.g., output signal level at the transmitter 300) of the communication link between the transmitter 300 and the coherent receiver 400 may be used to change or base the dynamic allocation.

In yet another aspect of this application, the transmitter DSP 302 may apply Orthogonal Frequency Division Multiplexing (OFDM) to the input data after mapping to the plurality of subcarrier signals, which spread a large data payload on a series of low-bandwidth subcarrier signals. Conventional OFDM systems are aimed at maximizing spectral efficiency, and generally are not optimized to operate in a scattering environment. Accordingly, the aspects of this application discussed herein are applied to the input data in addition to the OFDM techniques used for the input data by the transmitter DSP 302 to account for the scattering effects caused by the free-space optical medium. In other words, only OFDM techniques may not be sufficient to account for the scattering effects encountered by optical data transmitted by the transmitter 300 over the free-space optical communication channel.

In one aspect of this application, the transmitter DSP 302 includes processor executable code in a memory unit (not shown) of the transmitter DSP 302. Such a memory unit may include, but is not limited to, read-only memory (ROM), random access memory (RAM), and variations thereof (e.g., dynamic RAM, etc.). The processor executable code may be executed by the transmitter DSP 302 to implement the various transmission functionalities of the transmitter 300. For example, such processor executable code may be executed to carry out dynamic allocation of the input data to the plurality of subcarrier signals. The processor executable code may be modified to program the transmitter DSP 302 using high level or low level programming languages, or combinations thereof (e.g., C, C++, Visual C++, MATLAB® provided by The MathWorks, Inc. of Natick, Mass., Assembly language compilers, hardware description languages, and the like, or combinations thereof).

According to another aspect of this application, the input data may be applied to the individual subcarrier signals in the plurality of subcarrier signals. This may be carried out in the electrical domain by the transmitter DSP 302. Specifically, each subcarrier carries data individually, and is modulated in each approximate 1 µs period. This electrical modulation may be performed, for example, via on/off keying (OOK), although other types of modulation techniques including but not limited to, a Quadrature Phase Shift Keying (QPSK), a Frequency-Shift Keying (FSK), a Quadrature-Amplitude Modulation (QAM), and/or a Pulse Amplitude Modulation (PAM), could be used.

In yet another aspect of this application, the overall data transmission rate will be approximately n times the data rate of each individual subcarrier ('n' being an integer greater than one). In an alternative aspect, all but one of the n channels in the individual frequency bands 202(1)-202(n) will be off during each approximate 1 µs period, and the particular channel that is on during that period contains the information that is being transmitted. In this case, the overall data transmission rate will be approximately $\log_2(n)$ times the data rate of the approximately 1 µs period. Clearly, there may be intermediate cases as well, in which, for example, exactly m of the n subcarrier signals may carry energy in each timeslot, where m n. Selection of only one, or more than one, of the plurality of subcarrier signals at a time may be carried out by the transmitter DSP 302. Further, additionally, alternatively, or optionally, the transmitter DSP 302 may switch between or change to a different one of the plurality of subcarrier signals as a function of time to transmit information (e.g., the input data to the transmitter DSP 302). For example, various time based hopping codes may be implemented by the transmitter DSP 302 to change or hop between the subcarrier signals. Similar codes may then be present at a receiver digital signal processor (DSP) 416 (shown in FIG. 4) to retrieve the input data, in accordance with various aspects of this patent application.

The DAC 304 may convert the digital signals including the data mapped to the plurality of subcarrier signals into analog form for electrical modulation of the transmit laser 308 (directly by injection or via the optical modulator 306).

The optical modulator 306 may be absorptive or refractive. By way of example only and not by way of limitation, a Lithium-Niobate modulator may be used as the optical modulator 306, although other types of optical modulators understood by one of ordinary skill in the art may be used.

The transmit laser 308 may be a semiconductor laser, although other types of lasers (e.g., solid state) could be used as will be understood by one of ordinary skill in the art. The transmit laser 308 is configured to output the narrow-linewidth output carrier optical signal at a suitable wavelength (e.g., 513 nm for an undersea channel). In one aspect of this application, the narrow-linewidth output carrier optical signal from the transmit laser 308 may be tunable using, for example, external feedback from a reflector. The narrow-linewidth output carrier optical signal output by the transmit laser 308 may have an example linewidth of 1 MHz. It will be appreciated by one of ordinary skill in the art that the linewidth requirements for the transmit laser 308 may be different from lasers used for fiber optic communication where scattering is relatively negligible compared to the scattering by the free-space optical channels such as water or space.

The optical filter 310 may be a thin film filter, an optical disk, or the like. Generally, absorptive, interference type, or dichroic components, or combinations thereof may be used to filter the modulated narrow-linewidth output carrier optical signal at the output of the optical modulator 306 (or, at the output of the transmit laser 308 if no external optical modulator is present). As discussed, the optical filter 310 may be optional in one aspect of the application.

The combination of the transmit laser 308, the optical modulator 306, and the optical filter 310 generate a modulated optical signal for transmission from the transmitter 300. This optical signal contains the information to be transmitted, as applied by the DAC 304 to the optical modulator 306.

It will be appreciated by one of ordinary skill in the art reading this patent application that there is a distinction between the electrical modulation format, which is the format generated by the combination of the transmitter DSP 302 and the DAC 304, and the optical modulation format, which is the format generated by the combination of the transmit laser 308, the optical modulator 306, and the optical filter 310. Depending on the optical modulation format chosen, this optical signal may contain an optical carrier (a remnant of the unmodulated signal from the transmit laser 308), and may contain one or two optical sidebands, which include the optical subcarriers carrying the information to be transmitted. FIG. 2 shows the spectrum of the optical signal to be transmitted by the transmitter 300 for the example case of an optical modulation format of single-sided-suppressed-carrier modulation produced by the modulation of the narrow-linewidth output carrier optical signal from the transmit laser 308, which is highly spectrally-efficient. Again, as will be understood by one of ordinary skill in the art in view of this patent application, other optical modulation formats may also be used.

The optical modulator 306 in FIG. 3 may be an optical phase modulator, optical intensity modulator, or other forms of optical modulators. A particularly advantageous choice of the optical modulator 306 may generate a single-sideband signal, as understood by one of ordinary skill in the art reading this patent application.

The final stage of the transmitter 300 includes the HPOA 312. The HPOA 312 may be another laser or a semiconductor amplifier, a Raman amplifier, a rare-earth doped-fiber amplifier, a parametric amplifier, and the like. The HPOA 312 boosts the modulated narrow-linewidth output carrier optical signal to a power level appropriate for transmission over the free-space communication channel between the transmitter 300 and the coherent receiver 400. The HPOA 312 is designed to operate at an optimum power level to avoid high-power non-linearities from distorting the modulated narrow-linewidth output carrier optical signal while at the same time having enough power to reach and be detected by the coherent receiver 400. In addition to the HPOA 312, the transmitter 300 may optionally include a nonlinear optical element (not shown) to shift the optical signal output to a band appropriate for transmission through the medium. For example, a Nd:YAG laser transmitter operating at 1064 nm could be frequency doubled to 532 nm for relatively low-loss transmission through seawater.

Figure 4:
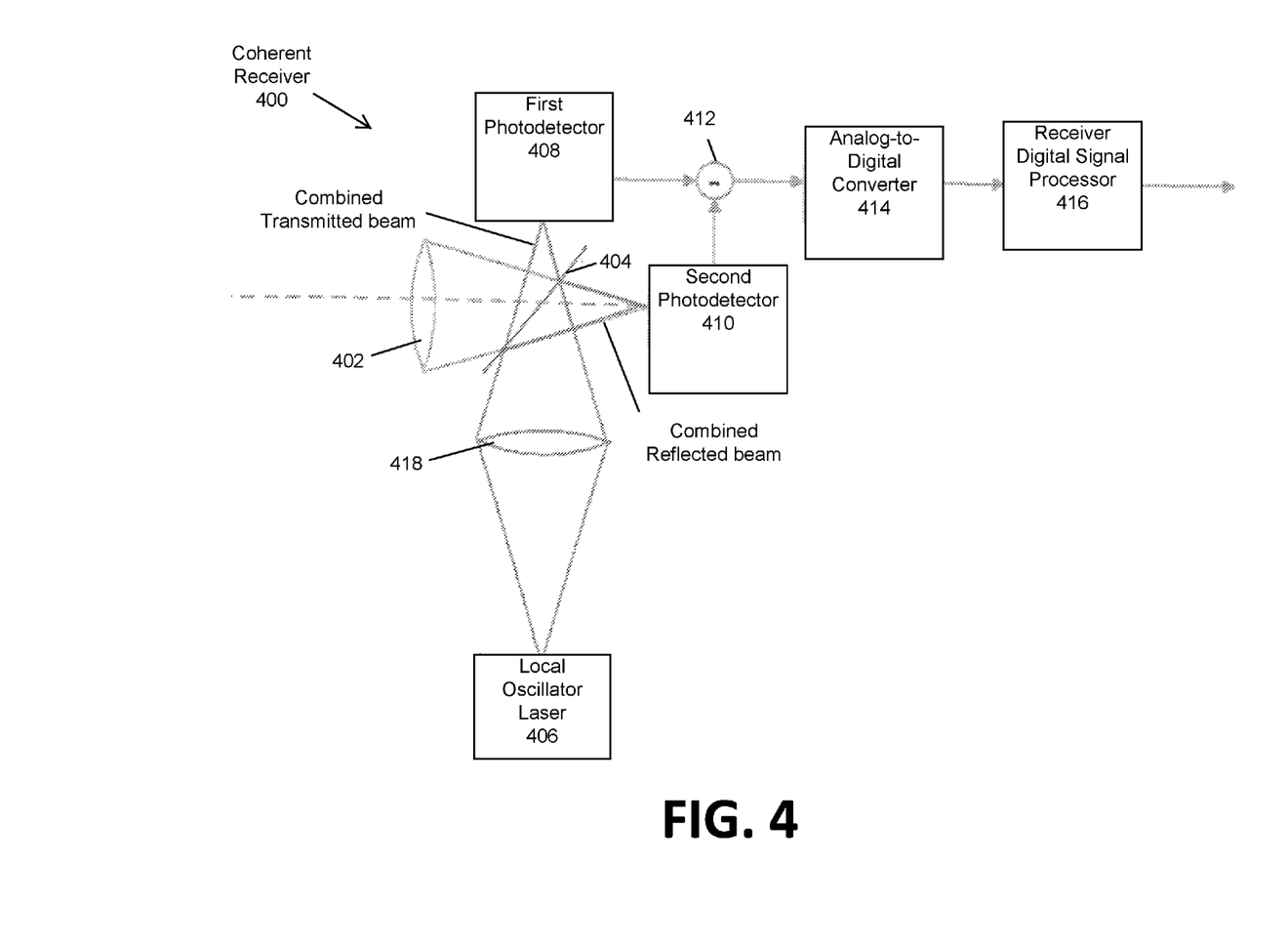
FIG. 4 illustrates a coherent receiver for a free-space optical communication system, according to an aspect of the application.

Referring to FIG. 4, the coherent receiver 400 is illustrated in accordance with an aspect of this application. The coherent receiver 400 includes receiving optics 402 upon which the optical signal having the modulated narrow-linewidth output carrier optical signal from the HPOA 312 is incident. The coherent receiver 400 includes a beam-splitter 404 optically coupled at an input to a local oscillator laser 406 via collimating optics 418 and at an output to a first photodetector 408 and a second photodetector 410. Respective outputs of the first photodetector 408 and the second photodetector 410 are coupled to a subtractor 412. An output of the subtractor 412 is coupled to an analog to digital converter (ADC) 414. The ADC 414 is coupled to the receiver DSP 416. An output of the receiver DSP 416 ideally is the input data to the transmitter 300 (shown in FIG. 3), which the receiver DSP 416 may then further output to an output device (e.g., a monitor) or a memory device for storage and subsequent retrieval. The coherent receiver 400 is "coherent" in terms of the optical signal of the local oscillator laser 406 being configured to beat with the individual frequency bands 202(1)-202(n) of the of the modulated narrow-linewidth output carrier optical signal from the transmitter 300, as illustrated for example by a beat frequency 506 in FIG. 5

Figure 5:
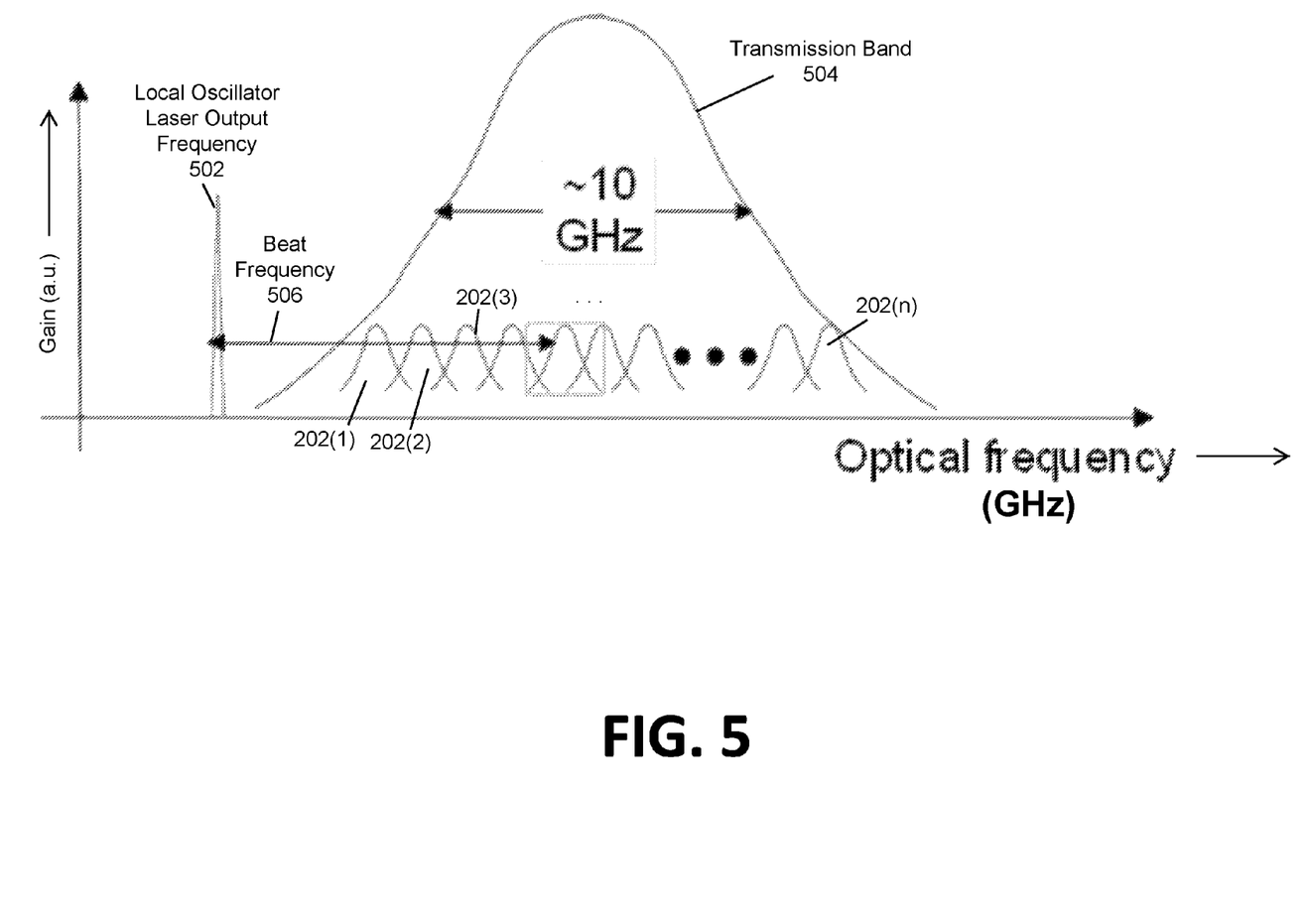
FIG. 5 illustrates an optical spectrum of a combination of the output of a local oscillator laser along with the plurality of narrow frequency bands of the plurality of subcarrier signals received at the coherent receiver of FIG. 4, according to an aspect of the application.

The local oscillator laser 406 may be a semiconductor laser, although other types of lasers (e.g., solid state) could be used as will be understood by one of ordinary skill in the art. The local oscillator laser 406 is configured to output an optical signal. The optical signal from the local oscillator laser 406 has an output frequency 502 offset outside a transmission band 504 (corresponding to the larger bandwidth channel 204) of the transmitter 300, as illustrated in FIG. 5. It will be appreciated by one of ordinary skill in the art that though FIG. 5 illustrates the output frequency 502 of the local oscillator laser 406 to be at a lower frequency that the transmission band 504, the output frequency 502 may be positioned at a higher frequency that the transmission band 504, but still outside the transmission band 504. Still alternatively, in accordance with another aspect of this patent application, the output frequency 502 may fall within the transmission band 504. The positioning of the output frequency 502 of the local oscillator laser 406 may take into account the noise and interference encountered by the modulated narrow-linewidth output carrier optical signal transmitted by the transmitter 300 upon travel through the free-space scattering medium. The optical signal output from the local oscillator laser 406 is incident on the collimating optics 418.

The beam splitter 404 may be a 50-50 type beam splitter configured to reflect 50% of incident electromagnetic energy and transmit the remaining 50% of the incident electromagnetic energy. Alternatively, the beam splitter 404 may be a 40-60 or a 60-40 type beam splitter, although other types of reflection and transmission characteristics of the beam splitter 404 could be used. By way of example only and not by way of limitations, the beam splitter 404 may be cubical type or plate type. The beam splitter 404 outputs two optical signals after forming a combined optical signal. The combined optical signal is a combination of the optical signal from the local oscillator laser 406 and the modulated narrow-linewidth output carrier optical signal transmitted from the transmitter 300 received at the beam splitter 404 via the receiving optics 402. A portion (e.g., 50%) of the combined optical signal is output to the first photodetector 408 as a first optical signal. The remaining portion (e.g., 50%) of the combined optical signal is output to the second photodetector 410 as a second optical signal.

Each of the first photodetector 408 and the second photodetector 410 convert, respectively, the first optical signal and the second optical signal to a first electrical signal and a second electrical signal. Each of the first photodetector 408 and the second photodetector 410 may be a semiconductor based photodetector, although other types of photodetectors could be used, as will be understood by one of ordinary skill in the art in view of this application. FIG. 5 illustrates a frequency spectrum of the combined optical signal incident on the first photodetector 408 and the second photodetector 410 in the optical frequency domain. The combined optical signal at the beam-splitter 404 includes the received optical signal (as shown in FIG. 2) at the receiving optics 402 from the transmitter 300 along with a narrow output frequency 502 of the optical signal from the local oscillator laser 406.

Figure 6:
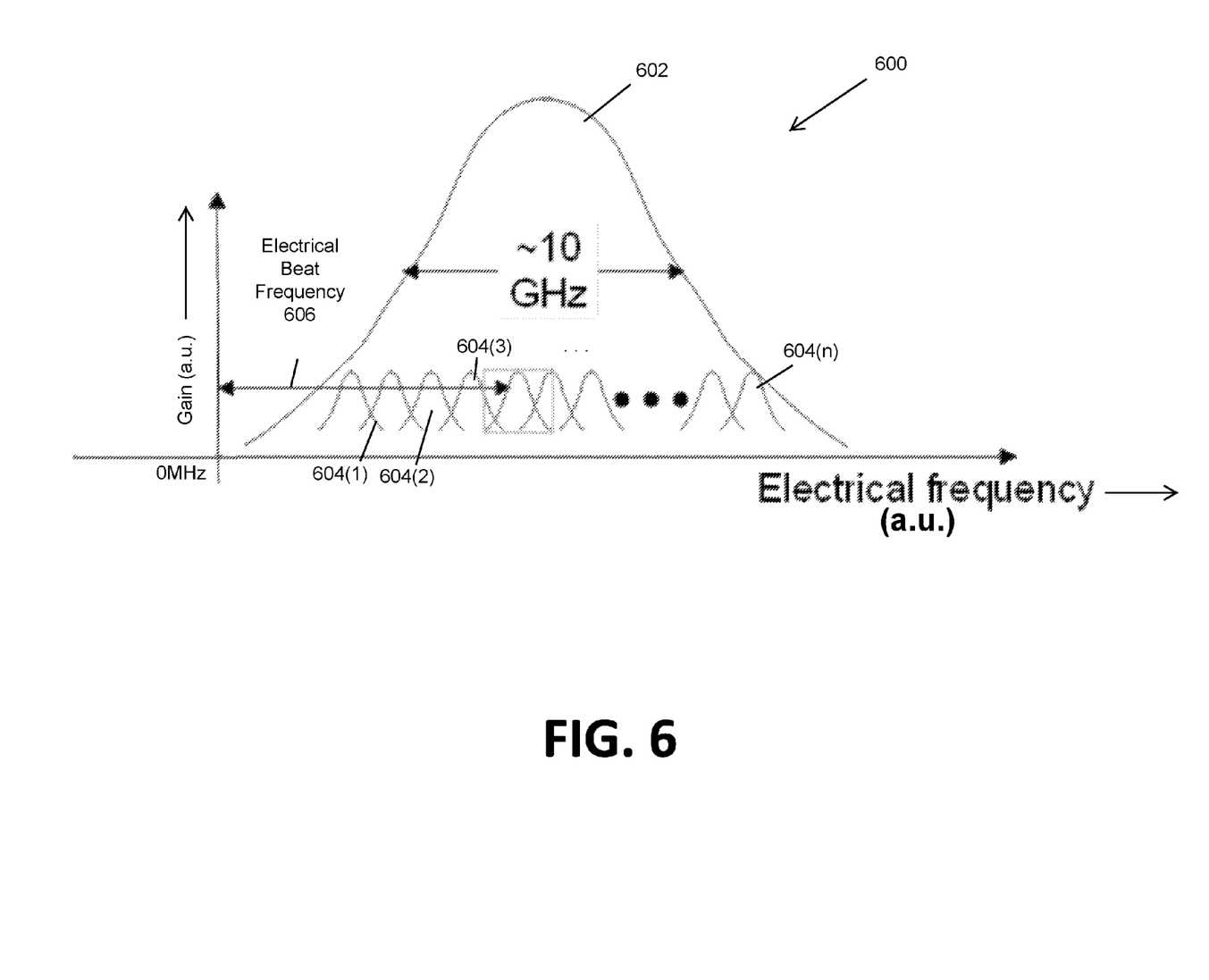
FIG. 6 illustrates frequency spectrum of an electrical signal generated by each photodetector shown in FIG. 4, according to an aspect of the application.

In each of the first photodetector 408 and the second photodetector 410, light from the local oscillator laser 406 beats with the numerous modulated signal tones 604(1)-604(n) corresponding to the individual frequency bands 202(1)-202(n) of the plurality of subcarrier signals. As a result, the first electrical signal and the second electrical signal are produced respectively, each of the first electrical signal and the second electrical signal being the difference between the output frequency 502 of the local oscillator laser 406 and the modulated signal tones 604(1)-604(n) corresponding to the individual frequency bands 202(1)-202(n) of the plurality of subcarrier signals. The first electrical signal and the second electrical signal generated by each of the first photodetector 408 and the second photodetector 410, respectively, has a spectrum 600 as shown in FIG. 6.

When the two electrical signals from the first photodetector 408 and the second photodetector 410 illustrated in FIG. 4 are electronically subtracted at the subtractor 412, a resulting signal 602 (shown in FIG. 6) is generated that improves the signal-to-noise ratio of the modulated signal tones 604(1)-604(n) corresponding to the individual frequency bands 202(1)-202(n) of the plurality of subcarrier signals and reduces impairments, such as noise due to the local oscillator laser 406. FIG. 6 further illustrates an electrical beat frequency 606 shown beating with an example one of the modulated signal tones 604(1)-604(n), with the output frequency 502 of the local oscillator laser 406 centered at zero frequency as a result of the subtraction by the subtractor 412. This resulting signal is applied to the analog-to-digital converter (ADC) 414 and is digitized.

The digitized output from the ADC 414 is passed to the receiver DSP 416. In the receiver DSP 416 shown in FIG. 4, any differences between phase and frequency of the local oscillator laser 406 and the transmit laser 308 in the transmitter 300 are corrected. Since these two narrow-linewidth lasers (i.e., the transmit laser 308 and the local oscillator laser 406) are frequency controlled, these differences between the phase and frequency are small and slowly changing, and as such, are easy to correct at the receiver DSP 416.

In one aspect of this application, the receiver DSP 416 includes processor executable code in a memory unit of the receiver DSP 416. The processor executable code may be executed by the receiver DSP 416 to implement the various coherent reception and detection functionalities of the coherent receiver 400. For example, such processor executable code may be executed to carry out extraction of the input data from the plurality of subcarrier signals obtained at the coherent receiver 400. The processor executable code may be modified to program the receiver DSP 416 using high level or low level programming languages, or combinations thereof (e.g., C, C++, Visual C++, MATLAB® provided by The MathWorks, Inc. of Natick, Mass., Assembly language compilers, hardware description languages, and the like, or combinations thereof).

Subsequently, the receiver DSP 416 is configured to recover the transmitted data in the individual frequency bands 202(1)-202(n) by performing an inverse Fourier Transform or other processing on the difference electrical signal that was digitized by the ADC 414. It will be appreciated that the receiver DSP 416 may utilize other types of frequency domain to time domain transform based on the performance metric, including but not limited to inverse Cosine transforms, wavelet based transform, and the like. This permits detection of the data on each subcarrier in the plurality of subcarrier signals. Finally, the plural recovered data in in the individual frequency bands 202(1)-202(n) are combined, decoded (for interleaving/FEC), and optionally decrypted, to recover the original broadband data channel input to the transmitter DSP 302.

In even another aspect of this application, the coherent receiver 400 may be an unbalanced coherent receiver. In this case, an unbalanced coherent receiver would omit the second photodetector 410 and the subtractor 412 shown in FIG. 4. In addition, more complex balanced coherent receivers could be employed to compensate for polarization issues and/or recover both in-phase and quadrature (I & Q) optical signals, if desired. In an alternative aspect of this patent application, if the data carrying channels are transmitted along with an optical carrier, a direct-detection receiver may recover the signal at the coherent receiver 400. Similarly, a wide variety of electrical modulation and demodulation formats may be applied to modulate the data on the subcarriers and demodulate the subcarriers to recover the data. This includes on/off keying (OOK), Quadrature Phase Shift Keying (QPSK), Frequency-Shift Keying (FSK), Quadrature-Amplitude Modulation (QAM), and Pulse Amplitude Modulation (PAM). As described earlier, there are also a variety of optical modulation formats that may be employed. For example, depending on the optical modulation format chosen, the optical signal output by the transmitter 300 may contain an optical carrier (a remnant of the unmodulated signal from the transmit laser 308), and may contain one or two optical sidebands, which include the optical subcarriers carrying the information to be transmitted. For example, in FIG. 2, a frequency spectrum of the optical signal to be transmitted by the transmitter 300 for the example case of an optical modulation format of single-sided-suppressed-carrier modulation, which is highly spectrally-efficient, is shown. Again, as will be understood by one of ordinary skill in the art in view of this patent application, other optical modulation formats may also be used.

A particular advantage of the single-sideband suppressed-carrier modulation format shown in FIG. 2 and described earlier is that the frequency and phase of the local oscillator laser 406 does not need to precisely replicate that of the transmit laser 308. In general, coherent receivers that make use of both upper and lower optical sideband control for the frequency and phase of the local oscillator laser 406 with a high precision. In the single-sideband suppressed-carrier modulation format, offsets in the frequency of the local oscillator laser 406 from the transmit laser 308 are manifest only as frequency offsets in the received electrical subcarrier signals shown as the modulated signal tones 604(1)-604(n) in FIG. 6. These offsets are easily compensated in the receiver DSP 416, as will be understood by one of ordinary skill in the art reading this patent application.

In a further aspect of this application, under some impairment conditions, some of the subcarrier data channels (i.e., individual frequency bands 202(1)-202(n)) may be received with better Bit Error Rate (BER) than others. Data may be modulated on the various subcarriers with an interleaving/Forward Error Correction (FEC) coding scheme by the transmitter DSP 302 that permits the overall data payload to be successfully recovered error-free even if some of the subcarriers are experiencing high BERs. The mapping to the various subcarriers may also be adjusted dynamically depending on their individual performance by the transmitter DSP 302, as discussed. Likewise, inverse operations at the coherent receiver 400 (e.g., demodulation) may then be performed.

In even a further aspect of this patent application, an optical Discrete Multi-Tone (DMT) modulation technique may be applied at the transmitter 300. This technology takes a broadband data channel and modulates it on a large number of optical subcarrier signals. It is particularly useful when trying to operate over frequency ranges that have widely varying transmission and interference. The systems and techniques discussed herein for the present application encounter unique impairments in the free-space optical channel and require different solutions, for example, from the radio-frequency (RF) and wired environments, and accordingly, the implementation approach is very different from the RF and wired technology domains.

Figure 7:
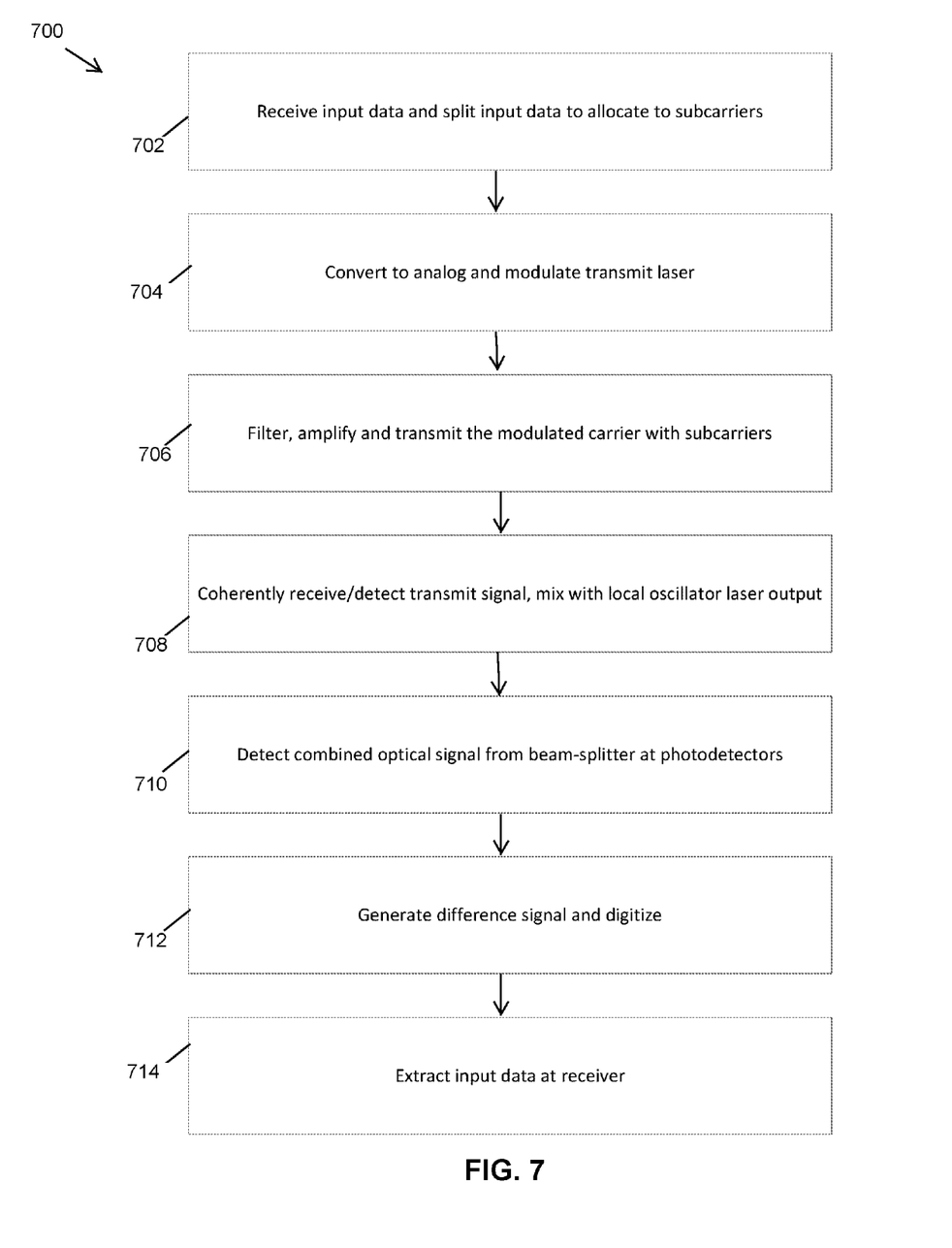
FIG. 7 illustrates a free-space optical communication method, according to an aspect of the application.

Referring to FIG. 7, a flowchart for a free-space optical communication method 700 is illustrated, in accordance with an aspect of this application. FIG. 7 presents the free-space optical communication method 700 as a flow diagram, although the free-space optical communication method 700 may be understood using other types of presentations in addition to or as an alternative to the flowchart of FIG. 7, such as process diagrams, graphs, charts, equations, timing diagrams, etc. In one aspect, one or more processes or operations in the free-space optical communication method 700 may be carried out at the transmitter 300 (e.g., at the transmitter DSP 302) and/or at the coherent receiver 400 (e.g., at the receiver DSP 416). The free-space optical communication method 700 may at least partially be implemented by executing the computer executable instructions stored in an internal memory of the transmitter 300 and/or the coherent receiver 400.

In yet another aspect, in the free-space optical communication method 700, one or more processes or operations, or sub-processes thereof, may be skipped or combined as a single process or operation, and a flow of processes or operations in the free-space optical communication method 700 may be in any order not limited by the specific order illustrated in FIG. 7. For example, one or more processes or operations may be moved around in terms of their respective orders, or may be carried out in parallel. The term "flow," as used with respect to FIG. 7, generally refers to a logical progression of operations in an exemplary manner carried out at the transmitter 300 and/or the coherent receiver 400. However, such a flow is by way of example only and not by way of limitation, as at a time, the flow may proceed along multiple operations or processes of the free-space optical communication method 700. Further, the free-space optical communication method 700 may be carried out by the transmitter DSP 302 and/or the receiver DSP 416 for various types of devices, e.g., underwater vehicles, satellites, above-ground free-space optical systems, and the like. The free-space optical communication method 700 may be implemented by the transmitter DSP 302 and/or the receiver DSP 416 in a high level or a low level programming language (e.g., C++, assembly language, etc.) using logic circuitry therein (e.g., programmable logic circuit (PLC), etc.) and by executing the computer executable instructions. In one aspect, the internal memory may include a non-transitory computer readable medium. The non-transitory computer readable medium may include instructions thereupon, which when executed by the transmitter DSP 302 and/or the receiver DSP 416 cause the transmitter DSP 302 and/or the receiver DSP 416 to implement the free-space optical communication method 700.

The free-space optical communication method 700 may begin in an operation 702 in which the transmitter DSP 302 is configured to receive input data from a data source (e.g., a computer, another transmitter, etc.). The input data may be referred to herein as broadband data. The transmitter DSP 302 splits the data stream into a large number (three or more) of subcarrier signals corresponding to the individual frequency bands 202(1)-202(n) shown in FIG. 2. In addition, the transmitter DSP 302 may apply interleaving and/or Forward Error Correction (FEC), as well as dynamic allocation of data to each of the plurality of subcarrier signals based on their current performance, as measured by a performance metric (e.g., BER).

In an operation 704, the output of the transmitter DSP 302 is converted to a high-speed analog signal by the DAC 304. This high speed signal is applied to the optical modulator 306, which modulates the narrow-linewidth output carrier optical signal output by the transmit laser 308 according to the analog electrical signal from the DAC 304 corresponding to the data on the plurality of subcarrier signals. The output of the optical modulator 306 of FIG. 3 may also contain optical energy in the narrow-linewidth output carrier optical signal from the transmit laser 308, as well as the plurality of subcarrier signals with the individual frequency bands 202(1)-202(n) (shown in FIG. 2) symmetrically placed relative to the narrow-linewidth output carrier optical signal. In some cases, it may be desirable to transmit these other optical signals, but in other cases, it may not be desirable.

In an operation 706, the modulated narrow-linewidth output carrier optical signal may then be filtered by the optical filter 310, which can remove any residual carrier and/or subcarriers that are generated in the modulation process that are undesired. The modulated narrow-linewidth output carrier optical signal is then applied to the HPOA 312 that boosts (amplifies) the modulated narrow-linewidth output carrier optical signal to a power level appropriate for transmission over the free-space communication channel. Then, the modulated narrow-linewidth output carrier optical signal is launched into the scattering medium between the transmitter 300 and the coherent receiver 400 using appropriate optics (not shown), as understood by one of ordinary skill in the art. In this respect, the transmitter 300 is configured to generate the high-power optical signal having the modulated narrow-linewidth output carrier optical signal (with data on the plurality of subcarrier signals) whose spectrum is illustrated in FIG. 2 as the individual frequency bands 202(1)-202(n).

In an operation 708, the coherent receiver 400 is configured to receive the plurality of subcarrier signals and extract the transmitted data from the plurality of subcarrier signals after traversal over the free-space scattering medium. In one aspect, the coherent receiver 400 may be present in an underwater environment. Various aspects of this application are equally applicable to an optical detection method in such an underwater environment. Such receiving of the plurality of subcarrier signals may be carried out by mixing, at the beam-splitter 404 of the coherent receiver 400, the received plurality of subcarrier signals from the transmitter 300 with an output signal from the local oscillator laser 406. The local oscillator output signal would in general have the output frequency 502 outside the transmission band 504 of the transmitter 300, although in alternative implementations, the output frequency 502 may be within the transmission band 504.

In an operation 710, detecting, at the first photodetector 408 of the coherent receiver 400, a first optical signal transmitted through the beam splitter 404 is carried out. Likewise, at the second photodetector 410, detecting a second optical signal reflected from the beam splitter 404 is carried out. In response to detecting the first optical signal transmitted through the beam splitter 404, the first photodetector 408 may output a first electrical signal that includes a set of frequencies that are generated from the beating of the optical signal from the local oscillator laser 406 and the received signal from the transmitter 300, the first electrical signal having frequency components that correspond to the individual frequency bands 202(1)-202(n) with data therein. Likewise, in response to detecting the second optical signal reflected from the beam splitter 404, the second photodetector 410 may output a second electrical signal that includes another set of frequencies that are also generated from the beating of the optical signal from the local oscillator laser 406 and the received signal from the transmitter 300, the second electrical signal having electrical signal having frequency components that correspond to the individual frequency bands 202(1)-202(n) with data therein.

In an operation 712, a difference signal corresponding to a difference between the first electrical signal and the second electrical signal is generated by the subtractor 412 of the coherent receiver 400. The difference signal is digitized by the ADC 414 and forwarded in a digital form to the receiver DSP 416.

In an operation 714, the receiver DSP 416 carries out extracting or obtaining the data originally provided to the transmitter DSP 302, which data was subsequently transmitted as part of the plurality of subcarrier signals. Such obtaining of the transmitted data by the receiver DSP 416 includes correcting for a phase difference and a frequency difference between the local oscillator laser 406 of the coherent receiver 400 and the transmit laser 308 of the transmitter 300. The receiver DSP 416 then performs a frequency transformation on the difference signal from frequency domain to the time domain, e.g., using an inverse Fourier transform. The receiver DSP 416 may then carry out decoding of the difference signal, after correcting the phase and frequency difference and after performing the frequency transformation, for interleaving and forward error correction. Further, if the transmitter DSP 302 had encrypted the input data at any stage, either prior to or after splitting the data into the plurality of subcarrier signals, the receiver DSP 416 performs a decryption on the digitized difference signal to obtain the original input data.

Accordingly, various aspects of this application provide a single transmitter (i.e., the transmitter 300) and a single receiver (i.e., the coherent receiver 400) to perform free-space optical communications with greatly increased data rates in scattering environments, and advantageously reduce the number of transmitter receiver components compared to the conventional free-space optical communication systems by eliminating the use of separate transmitters and receivers for each of the frequencies in the individual frequency bands 202(1)-202(n). Another exemplary advantage of the aspects disclosed herein is that the coherent receiver 400 simplifies the overall design of the free-space optical communication system while at the same time achieving high data throughput in a scattering environment such as an underwater environment.

The present description is for illustrative purposes only, and should not be construed to narrow the breadth of the present application in any way. Thus, those skilled in the art will appreciate that various modifications might be made to the presently disclosed embodiments without departing from the full and fair scope and spirit of the present application. Other aspects, features and advantages will be apparent upon an examination of the attached drawings and appended claims.

What is claimed is:

1. A free-space optical communication system, comprising:
    a transmitter configured to optically transmit data in a plurality of subcarrier signals over a free-space scattering medium, and configured to optically transmit the data by selecting m out of n number of the plural subcarrier signals over the free-space scattering medium, where m is less than n, and m, n are positive integer values; and
    a coherent receiver configured to receive the plurality of subcarrier signals and extract the transmitted data from the plurality of subcarrier signals after traversal over the free-space scattering medium,
    wherein a digital signal processor of the transmitter is configured to select only m of the plural subcarrier signals for transmitting at a time, and is configured to change between the plurality of subcarrier signals as a function of time to transmit information based upon a time-hopping code.

2. The free-space optical communication system of claim 1, wherein the coherent receiver includes a local oscillator laser, the local oscillator laser having an output frequency offset outside a transmission band of the transmitter.

3. The free-space optical communication system of claim 2, wherein the coherent receiver includes:
    a beam splitter optically coupled to the local oscillator laser upon which an output signal form the local oscillator laser is incident along with the plurality of subcarrier signals,
    a first photodetector optically coupled to the beam splitter and configured to output a first electrical signal upon receiving a first optical signal transmitted through the beam splitter; and
    a second photodetector optically coupled to the beam splitter and configured to output a second electrical signal upon receiving a second optical signal reflected from the beam splitter.

4. The free-space optical communication system of claim 3, wherein the coherent receiver includes:
    a receiver digital signal processor to receive a difference signal corresponding to a difference between the first electrical signal and the second electrical signal to obtain the data in each of the plurality of subcarrier signals.

5. The free-space optical communication system of claim 1, wherein the transmitter includes:
    a transmitter digital signal processor configured to allocate the data to the plurality of subcarrier signals; and
    a transmit laser having a narrow-linewidth output carrier optical signal modulated by the plurality of subcarrier signals prior to a transmission from the transmitter.

6. The free-space optical communication system of claim 5, wherein a narrow-linewidth output carrier optical signal is modulated by the plurality of subcarrier signals after conversion to an analog signal by a digital to analog converter.

7. The free-space optical communication system of claim 6, wherein the modulation of the narrow-linewidth output carrier optical signal produces a single-sideband suppressed carrier optical signal.

8. The free-space optical communication system of claim 1, wherein the coherent receiver is a balanced coherent receiver and the transmitter includes a modulator for modulating a transmit laser with the plurality of subcarrier signals using on-off keying.

9. The free-space optical communication system of claim 1, wherein the digital signal processor is configured to:
    apply the data individually to each subcarrier signal in the plurality of subcarrier signals,
    modulate said each subcarrier signal every 1 µs with the data, and
    mix the modulated plurality of subcarrier signals with a narrow-linewidth output carrier optical signal from a transmit laser.

10. A free-space optical communication method, comprising:
    selecting, at a transmitter, m out of n number of plural subcarrier signals for transmission over a free-space scattering medium, where m is less than n, and m, n are positive integer values;
    transmitting optically, from the transmitter, data on the selected m number of subcarriers in the plurality of subcarrier signals over the free-space scattering medium; and
    receiving, at a coherent receiver, the plurality of subcarrier signals, wherein said receiving includes extracting, at the coherent receiver, the transmitted data from the plurality of subcarrier signals after traversal through the free-space scattering medium,
    wherein the selecting step includes selecting, at a transmitter digital signal processor, only m of the plurality of subcarrier signals for the transmitting step at a time, and changing between the plurality of subcarrier signals as a function of time to transmit information based upon a time-hopping code, and wherein the transmitting step includes:
applying, at the transmitter digital signal processor, the data individually to each subcarrier signal in the plurality of subcarrier signals,
modulating, at the transmitter digital signal processor, said each subcarrier signal every 1 µs with the data, and
mixing, at an optical modulator, the modulated plurality of subcarrier signals with a narrow-linewidth output carrier optical signal from a transmit laser.

11. The free-space optical communication method of claim 10, further comprising:
splitting, at a transmitter digital signal processor of the transmitter, the data into the plurality of subcarrier signals;
modulating, at an optical modulator of the transmitter, a narrow-linewidth output carrier optical signal from a transmit laser with the plurality of subcarrier signals including the data; and
amplifying, at an optical amplifier of the transmitter, the modulated narrow-linewidth output carrier optical signal for said transmitting over the free-space scattering medium.

12. The free-space optical communication method of claim 11, wherein prior to said transmitting, the transmitter digital signal processor carries out an interleaving and/or a forward error correction of the data.

13. The free-space optical communication method of claim 11, wherein the transmitter digital signal processor is further configured to dynamically allocate the data to the plurality of subcarrier signals, said dynamic allocation being based on a transmission metric of a communication link between the transmitter and the coherent receiver.

14. The free-space optical communication method of claim 10, wherein the receiving comprises:
mixing, at a beam-splitter of the coherent receiver, the received plurality of subcarrier signals with an output signal from a local oscillator laser, the output signal having a frequency offset outside a transmission band of the transmitter.

15. The free-space optical communication method of claim 14, wherein the receiving comprises:
detecting, at a first photodetector of the coherent receiver, a first optical signal transmitted through the beam splitter,
outputting, from the first photodetector, a first electrical signal corresponding to the first optical signal,
detecting, at a second photodetector of the coherent receiver, a second optical signal reflected from the beam splitter, and
outputting, from the second photodetector, a second electrical signal corresponding to the second optical signal.

16. The free-space optical communication method of claim 15, further comprising:
obtaining, at a receiver digital signal processor, the data in each of the plurality of subcarrier signals from a difference signal of the first electrical signal and the second electrical signal, said obtaining including:
correcting for a phase difference and a frequency difference between the local oscillator laser and a transmit laser of the transmitter,
performing a frequency transformation on the difference signal, and
decoding the difference signal, after said correcting and said performing the frequency transformation, for interleaving and forward error correction.

17. The free-space optical communication method of claim 10, wherein the transmitting comprises:
selecting, at the transmitter digital signal processor, at least two of the plurality of subcarrier signals for said transmitting, said selecting being programmable at the transmitter digital signal processor.

18. The free-space optical communication method of claim 10, wherein the modulating comprises:
selecting one of an On/Off Keying (OOK), a Quadrature Phase Shift Keying (QPSK), a Frequency-Shift Keying (FSK), a Quadrature-Amplitude Modulation (QAM), and a Pulse Amplitude Modulation (PAM) as a modulation technique for said each of the plurality of subcarrier signals.

19. An underwater optical detection method comprising:
receiving, at a coherent receiver in an underwater environment, m out of n number of a plurality of subcarrier signals optically transmitted from a transmitter in the underwater environment, where m is less than n, and m, n are positive integer values; and
extracting, at the coherent receiver, transmitted data in the m number of the plurality of subcarrier signals after traversal through the underwater environment,
wherein the plurality of received subcarrier signals are based on a digital signal processor of the transmitter that selects only m of the plurality of subcarrier signals for transmitting at a time, and changes between the plurality of subcarrier signals as a function of time to transmit information based upon a time-hopping code.

20. The underwater optical detection method of claim 19, wherein the plurality of received subcarrier signals are based on the digital signal processor performing the step of:
applying the data individually to each subcarrier signal in the plurality of subcarrier signals,
modulating said each subcarrier signal every 1 µs with the data, and
mixing the modulated plurality of subcarrier signals with a narrow-linewidth output carrier optical signal from a transmit laser.

* * * * *